(12) United States Patent
Fairgrieve et al.

(10) Patent No.: US 10,414,401 B2
(45) Date of Patent: Sep. 17, 2019

(54) CONTROLLER AND METHOD

(71) Applicant: Jaguar Land Rover Limited, Whitley, Coventry, Warwickshire (GB)

(72) Inventors: Andrew Fairgrieve, Rugby (GB); Jan Prins, Coventry (GB); Paul Beever, Rugby (GB); Nick Brockley, Lichfield (GB); Charlotte Cook, Coventry (GB); Jon Parr, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 190 days.

(21) Appl. No.: 15/113,164

(22) PCT Filed: Jan. 26, 2015

(86) PCT No.: PCT/EP2015/051519
§ 371 (c)(1),
(2) Date: Jul. 21, 2016

(87) PCT Pub. No.: WO2015/110644
PCT Pub. Date: Jul. 30, 2015

(65) Prior Publication Data
US 2017/0008532 A1    Jan. 12, 2017

(30) Foreign Application Priority Data
Jan. 24, 2014 (GB) .................................. 1401181.1

(51) Int. Cl.
*B60W 10/20* (2006.01)
*B60W 30/02* (2012.01)
(Continued)

(52) U.S. Cl.
CPC ....... *B60W 30/18172* (2013.01); *B60K 28/16* (2013.01); *B60W 10/10* (2013.01);
(Continued)

(58) Field of Classification Search
CPC .............. B60K 28/16; B60W 2520/30; B60W 2540/10; B60W 2550/14;
(Continued)

(56) References Cited

U.S. PATENT DOCUMENTS 8,538,652 B2    9/2013  Charpin et al.
2008/0045377 A1*  2/2008  Kaya ...................... B60K 6/365
                                                477/43
(Continued)

FOREIGN PATENT DOCUMENTS

FR    2913635 A1    9/2008
GB    2445325 A     7/2008
(Continued)

OTHER PUBLICATIONS

Combined Search and Examination Report corresponding to application No. GB1501258.6, dated Jun. 24, 2015, 7 pages.
(Continued)

*Primary Examiner* — Charles J Han
(74) *Attorney, Agent, or Firm* — Reising Ethington P.C.

(57) ABSTRACT

A motor vehicle controller comprising data processing apparatus, the data processing apparatus configured to carry out the steps of: receiving a surface friction signal indicative of a coefficient of friction between a road wheel and a driving surface; receiving an accelerator position signal indicative of a position of an accelerator control with respect to an allowable range of positions; determining a powertrain torque limit value corresponding to an amount of powertrain torque at which slip of a driving wheel is expected to exceed a predetermined amount, the powertrain torque limit value being determined at least in part in dependence on the surface friction signal; and determining and outputting a powertrain torque demand signal corresponding to an instant amount of torque to be developed by a powertrain, the (Continued)

powertrain torque demand signal being determined in dependence at least in part on the accelerator position signal according to a predetermined relationship.

15 Claims, 5 Drawing Sheets

(51) Int. Cl.
*B60K 28/16* (2006.01)
*B60W 30/18* (2012.01)
*B60W 10/10* (2012.01)
*B60W 10/18* (2012.01)
*B60W 10/22* (2006.01)

(52) U.S. Cl.
CPC ............ *B60W 10/18* (2013.01); *B60W 10/20* (2013.01); *B60W 10/22* (2013.01); *B60W 30/02* (2013.01); *B60W 2520/10* (2013.01); *B60W 2520/30* (2013.01); *B60W 2530/16* (2013.01); *B60W 2540/10* (2013.01); *B60W 2550/14* (2013.01); *B60W 2550/148* (2013.01); *B60W 2710/10* (2013.01); *B60W 2710/18* (2013.01); *B60W 2710/20* (2013.01); *B60W 2710/22* (2013.01); *B60W 2720/14* (2013.01); *B60W 2720/26* (2013.01); *B60W 2720/30* (2013.01)

(58) Field of Classification Search
CPC ....... B60W 2550/148; B60W 2720/26; B60W 2720/30; B60W 30/02; B60W 30/18172
See application file for complete search history.

(56) References Cited

U.S. PATENT DOCUMENTS

| | | |
|---|---|---|
| 2009/0055068 A1 | 2/2009 | Osaki et al. |
| 2015/0057883 A1 | 2/2015 | Kelly et al. |
| 2015/0073679 A1 | 3/2015 | Darnell et al. |
| 2015/0175009 A1 | 6/2015 | Beever et al. |

FOREIGN PATENT DOCUMENTS

| | | | |
|---|---|---|---|
| GB | 2499252 A | 8/2013 | |
| JP | S60147546 A | 8/1985 | |
| WO | WO-2013186208 A2 * | 12/2013 | ........... B60K 7/0007 |
| WO | WO2013186208 A2 | 12/2013 | |
| WO | WO2015074822 A1 | 5/2015 | |

OTHER PUBLICATIONS

International Search Report corresponding to International application No. PCT/EP2015/051519, dated Jul. 16, 2015, 7 pages.
Written Opinion corresponding to International application No. PCT/EP2015/051519, dated Jul. 16, 2015, 9 pages.

* cited by examiner

CONTROLLER AND METHOD

TECHNICAL FIELD

The present invention relates to controllers for motor vehicles. In particular but not exclusively the invention relates to a controller for controlling a response of a powertrain to driver torque demand.

BACKGROUND

It is known to provide a powertrain controller for controlling an amount of power developed by a powertrain of a vehicle for driving a vehicle. Known powertrain controllers receive a signal from an accelerator pedal of the vehicle indicating the position of the pedal with respect to a range of travel of the pedal. The controller controls the powertrain to develop an amount of torque that is calculated from a map of powertrain torque as a function of accelerator pedal position and other data such as potentially available torque and engine speed.

It is also known to provide a vehicle having a control system that is operable in one or more of a plurality of driving modes which may also be referred to as control modes or operating modes. In each driving mode, the control system is configured to cause each one of a plurality of vehicle subsystems to be operated in a subsystem configuration mode appropriate to the driving condition.

In one known system the subsystems include an engine management system, a transmission system, a steering system, a brakes system and a suspension system. The engine management system includes the powertrain controller. The powertrain controller stores a plurality of maps of powertrain torque as a function of accelerator pedal position, and associates one map with each configuration mode of the engine management system. The map associated with each configuration mode is adapted to provide improved vehicle performance under certain driving conditions.

The control modes typically include a grass/gravel/snow control mode (GGS mode) that is suitable for when the vehicle is travelling in grass, gravel or snow terrain, a mud/ruts control mode (MR mode) which is suitable for when the vehicle is travelling in mud and ruts terrain, a rock crawl/boulder mode (RB mode) which is suitable for when the vehicle is travelling in rock or boulder terrain, a sand mode which is suitable for when the vehicle is travelling in sand terrain (or deep soft snow) and a special programs OFF mode (SP OFF mode or SPO mode) which is a suitable compromise mode, or general mode, for all terrain conditions and especially vehicle travel on motorways and regular roadways. A number of control modes, and examples of their implementation, are disclosed in US2003/0200016, the content of which is hereby incorporated by reference.

The different terrain types are grouped according to the characteristics of the terrain such as friction and roughness. For example, it is appropriate to group grass, gravel and snow together as terrains that provide a low friction, smooth surface and it is appropriate to group rock and boulder terrains together as high friction, very high roughness terrains. Low friction modes may also include an ice mode in which the subsystems are controlled in a manner suitable for driving on ice, and one of which may be a mud mode in which the subsystems are controlled in a manner suitable for driving on mud.

In the GGS control mode, the engine management system employs an accelerator pedal position/engine torque map that provides relatively low levels of engine torque during an initial range of positions of the accelerator pedal, the amount of torque increasing more rapidly as a function of pedal position over a middle range of positions. This is so as to reduce excessive wheel spin when a driver attempts to accelerate a vehicle from rest.

In contrast, in the RC mode, the engine management system employs an accelerator pedal position/engine torque map that provides a relatively abrupt increase in engine torque during an initial range of positions of the accelerator pedal, in order to facilitate climbing of rocks and other obstacles presenting a relatively abrupt, steep increase in gradient of a path of travel of a vehicle.

In the sand mode, the engine management system is arranged to provide relatively low levels of drive torque for a given accelerator pedal position at low vehicle speeds and to provide relatively high levels of drive torque for a given throttle pedal position at higher vehicle speeds. Also in the sand mode a traction control system may be arranged to allow only relatively low levels of wheel spin when the vehicle is traveling at low speeds so as to avoid the vehicle wheels becoming submerged in sand, but to allow relatively high levels of wheel spin when the vehicle is traveling at higher speeds.

It is an aim of the present invention to provide improved traction characteristics for a motor vehicle when driving in conditions where surface coefficient of friction between one or more wheels of a vehicle and a driving surface is relatively low.

SUMMARY OF THE INVENTION

Embodiments of the invention may be understood with reference to the appended claims.

The present disclosure relates to a vehicle control system and control method and particularly, but not exclusively, to a control system and control method for controlling a vehicle speed. Aspects of the invention relate to a controller, a control system, a vehicle, a control method, a computer program carrier medium, a computer program product, a computer readable medium and a processor.

In one aspect of the invention for which protection is sought there is provided a motor vehicle controller comprising data processing apparatus, the data processing apparatus comprising:

means for receiving a surface friction signal indicative of a coefficient of friction between a road wheel and a driving surface;

means for receiving an accelerator position signal indicative of a position of an accelerator control with respect to an allowable range of positions;

means for determining a powertrain torque limit value corresponding to an amount of powertrain torque at which slip of a driving wheel is expected to exceed a predetermined amount, the powertrain torque limit value being determined at least in part in dependence on the surface friction signal; and means for determining and outputting a powertrain torque demand signal corresponding to an instant amount of torque to be developed by a powertrain, the powertrain torque demand signal being determined in dependence at least in part on the accelerator position signal according to a predetermined relationship, the controller being configured such that when the powertrain torque demand signal is in the region of the powertrain torque limit value the relationship between powertrain torque demand signal and accelerator position signal is modified relative to the predetermined relationship such that the response of the powertrain torque demand signal to the accelerator position signal is reduced.

It is to be understood that, in some embodiments, the accelerator position signal may be a virtual signal, generated for example by a speed control system such as a highway cruise control system or low speed off-road speed control system (which may also be referred to as an off-road or low speed cruise control system). The virtual accelerator pedal position signal may be fed to a powertrain controller in order to cause the powertrain to develop a required amount of torque at a given moment in time.

Optionally, the controller is configured such that when the accelerator position signal has a value that is within a predetermined value of the value of accelerator position signal corresponding to the powertrain torque limit value according to the predetermined relationship between the powertrain torque demand signal and accelerator pedal position signal, the relationship between powertrain torque demand signal and accelerator position signal is reduced.

Optionally, the predetermined value is a predetermined proportion of the accelerator position signal.

Optionally, the controller is configured such that when the powertrain torque demand signal corresponds to an amount of powertrain torque that is within a predetermined value of the powertrain torque limit value the relationship between powertrain torque demand signal and accelerator position signal is reduced.

Optionally, the predetermined value is a predetermined proportion of one selected from amongst the powertrain torque limit value and the powertrain torque demand signal.

It is to be understood that, once the relationship is flattened, the value of accelerator position signal corresponding to the powertrain torque limit value may be changed in some embodiments. Therefore, in some embodiments the controller may be configured to recalculate the range of values of accelerator position signal over which the relationship is flattened when the accelerator position signal has a value that is within a predetermined value of the value of accelerator position signal corresponding to the powertrain torque limit value according to the predetermined relationship. The relationship may subsequently flattened whilst the accelerator position signal indicates a value that is within a predetermined value of the value of accelerator position signal corresponding to the powertrain torque limit value according to the flattened relationship. Other arrangements may be useful in some embodiments.

The controller may be configured wherein the predetermined amount of slip is determined by the data processing apparatus in dependence at least in part on the surface friction signal.

The controller may be configured to receive a reference speed signal indicative of an instant vehicle speed, the controller being configured to determine the predetermined amount of slip in further dependence on the reference speed signal.

The controller may be configured to receive a terrain signal indicative of the nature of terrain over which a vehicle is driving, the controller being configured to determine the predetermined amount of slip in further dependence on the terrain signal.

Optionally, the terrain signal comprises a signal indicative of an amount of drag on a vehicle.

The terrain signal may comprise a driving mode signal indicative of a driving mode in which a vehicle is operating.

Optionally, the driving mode signal corresponds to a state of a manual driving mode selector input device or a signal indicative of a driving mode selected automatically by automatic driving mode selection means.

In another aspect of the invention for which protection is sought there is provided a motor vehicle controller comprising data processing apparatus, the data processing apparatus comprising:

means for receiving a surface friction signal indicative of a surface friction parameter corresponding to a coefficient of friction between a road wheel and a driving surface;

means for receiving an accelerator control signal indicative of a position of an accelerator control with respect to an allowable range of positions;

means for determining a critical powertrain torque limit value in dependence on the value of surface friction signal; and means for determining and outputting a value of an instant powertrain torque demand parameter corresponding to an instant amount of torque to be developed by a powertrain in dependence at least in part on the accelerator control signal and powertrain torque limit value.

In another aspect of the invention for which protection is sought there is provided a motor vehicle controller comprising data processing apparatus, the data processing apparatus comprising:

means for receiving a signal indicative of a surface friction parameter, surface_friction, corresponding to a coefficient of friction between a road wheel and a driving surface;

means for receiving a signal indicative of a position of an accelerator control with respect to an allowable range of positions, accel_ctrl_pos;

means for determining a critical powertrain torque limit value PT_TQ_CRIT in dependence on the value of surface_friction; and means for determining and outputting a value of a parameter PT_TQ corresponding to an instant amount of torque to be developed by a powertrain in dependence at least in part on the signals indicative of accelerator control position, accel_ctrl_pos, and powertrain torque limit value, PT_TQ_MAX.

In a further aspect of the invention for which protection is sought there is provided a motor vehicle controller comprising data processing apparatus, the data processing apparatus comprising:

means for receiving a signal indicative of a surface friction parameter, surface_friction, corresponding to a coefficient of friction between a road wheel and a driving surface;

means for receiving a signal indicative of a position of an accelerator control with respect to an allowable range of positions, accel_ctrl_pos;

means for determining a powertrain torque limit value, PT_TQ_MAX, corresponding to an amount of powertrain torque at which slip of a driving wheel is expected to exceed a predetermined amount, the value of PT_TQ_MAX being determined at least in part in dependence on the value of surface_friction; and means for determining and outputting a value of a parameter corresponding to an instant amount of torque to be developed by a powertrain, PT_TQ, in dependence at least in part on the signals indicative of accelerator control position and powertrain torque limit value.

Embodiments of the present invention have the advantage that the controller can manage the relationship between accelerator control position, for example accelerator pedal position, and powertrain torque demand, adapting the relationship to take into account prevailing surface friction conditions. Some embodiments of the invention may be arranged to improve vehicle composure by making it less easy for a driver inadvertently to cause excessive slip of one or more driving wheels whilst negotiating slippery terrain commonly found in off-road driving conditions. Embodiments of the present invention have the advantage that driver workload may be reduced, enabling a driver to focus their attention on steering a vehicle.

Some embodiments of the invention are arranged to provide an indication to a driver as to when the value of PT_TQ is approaching PT_TQ_MAX. A driver is therefore able to limit the amount by which the accelerator pedal control is moved in order to prevent PT_TQ from exceeding PT_TQ_MAX.

The controller may be configured wherein the predetermined amount of slip is determined by the data processing apparatus in dependence at least in part on at least one selected from amongst the surface friction parameter surface_friction.

The controller may be configured to receive a signal indicative of instant vehicle speed, ref_speed, the controller being configured to determine the predetermined amount of slip in further dependence on ref_speed.

The controller may be configured to receive a signal indicative of the nature of terrain over which a vehicle is driving, the controller being configured to determine the predetermined amount of slip in further dependence on the signal indicative of the nature of terrain over which a vehicle is driving. It is to be understood that the signal may be in the form of data such as one or more data packets received by the controller. The data may include a value of one or more parameters such as a parameter indicative of a driving mode in which a vehicle is operating, a value of surface coefficient of friction between one or more road wheels and a driving surface, and/or any other suitable parameter.

The signal indicative of the nature of terrain may include a signal indicative of an amount of drag on a vehicle.

The amount of drag on a vehicle may be useful in identifying whether a vehicle is travelling over a readily deformable surface such as sand, which may present a particular challenge to a driver attempting to traverse such terrain.

The signal indicative of the nature of terrain may include a signal indicative of a driving mode in which a vehicle is operating.

The signal indicative of a driving mode in which a vehicle is operating may correspond to a state of a manual driving mode selector input device or a signal indicative of a driving mode selected automatically by automatic driving mode selection means.

In a further aspect of the invention for which protection is sought there is provided a motor vehicle control system comprising a controller according to any preceding aspect of the present invention.

The driving modes may be control modes of at least one subsystem of a vehicle, the control system having a subsystem controller for initiating control of a vehicle subsystem in the selected one of the plurality of subsystem control modes, each one of the driving modes corresponding to one or more different driving conditions for a vehicle.

Optionally, in each subsystem control mode the system is configured to cause each one of a plurality of vehicle subsystems to be operated in a subsystem configuration mode appropriate to the driving condition.

Optionally, the driving modes include one or more control modes selected from the following:

control modes of at least one vehicle subsystem selected from amongst an engine management system, a transmission system, a steering system, a brakes system and a suspension system;

control modes of a suspension system and the plurality of subsystem configuration modes comprise a plurality of ride heights;

control modes of a fluid suspension system in which fluid interconnection can be made between suspensions for wheels on opposite sides of the vehicle, and wherein said plurality of subsystem configuration modes provide different levels of said interconnection;

control modes of a steering system which can provide steering assistance, and wherein said plurality of subsystem configuration modes provide different levels of said steering assistance;

control modes of a brakes system which can provide braking assistance, and said plurality of subsystem configuration modes provide different levels of said braking assistance;

control modes of a brake control system which can provide an anti-lock function to control wheel slip, and said plurality of subsystem configuration modes allow different levels of said wheel slip;

control modes of a powertrain system which includes a powertrain control means and an accelerator or throttle pedal, the subsystem configuration modes providing different levels of responsiveness of the powertrain control means to movement of the accelerator or throttle pedal;

control modes of a traction control system which is arranged to control wheel spin, and said plurality of subsystem configuration modes allow different levels of said wheel spin control modes of a yaw control system which is arranged to control vehicle yaw, and said plurality of subsystem configuration modes allow different levels of divergence of said vehicle yaw from an expected yaw;

control modes of a range change transmission and said subsystem configuration modes may include a high range mode and a low range mode of said transmission; and control modes of a transmission system operable in a plurality of transmission ratios and including a transmission control means arranged to monitor at least one parameter of the vehicle and to select the transmission ratios in response, and wherein the subsystem configuration modes include a plurality of transmission configuration modes in which the transmission ratios are selected differently in response to said at least one parameter.

In a further aspect of the invention for which protection is sought there is provided a motor vehicle comprising a control system according to a preceding aspect.

In an aspect of the invention for which protection is sought there is provided a method of controlling a motor vehicle implemented by a controller comprising:

receiving a surface friction signal indicative of a coefficient of friction between a road wheel and a driving surface;

receiving an accelerator control signal indicative of a position of an accelerator control with respect to an allowable range of positions;

determining a powertrain torque limit value corresponding to an amount of powertrain torque at which slip of a driving wheel is expected to exceed a predetermined amount, the powertrain torque limit value being determined at least in part in dependence on the surface friction signal; and determining and outputting a powertrain torque demand signal corresponding to an instant amount of torque to be developed by a powertrain, the powertrain torque demand signal being determined in dependence at least in part on the accelerator position signal according to a predetermined relationship, whereby when the powertrain torque demand signal is in the region of the powertrain torque limit value the relationship between powertrain torque demand signal and accelerator position signal is modified relative to the predetermined relationship such that the response of the powertrain torque demand signal to the accelerator position signal is flattened.

Optionally, when the accelerator position signal has a value that is within a predetermined value of the value of accelerator position signal corresponding to the powertrain torque limit value according to the predetermined relationship between the powertrain torque demand signal and accelerator pedal position signal, the relationship between powertrain torque demand signal and accelerator position signal is flattened.

Optionally, the predetermined value is a predetermined proportion of the accelerator position signal.

Optionally, when the powertrain torque demand signal corresponds to an amount of powertrain torque that is within a predetermined value of the powertrain torque limit value the relationship between powertrain torque demand signal and accelerator position signal is flattened.

Optionally, the predetermined value is a predetermined proportion of one selected from amongst the powertrain torque limit value and the powertrain torque demand signal.

The method may comprise determining the predetermined amount of slip in dependence at least in part on the surface friction signal.

The method may comprise receiving a signal indicative of instant vehicle speed, ref_speed, and determining the predetermined amount of slip in further dependence on ref_speed.

Optionally the method comprises receiving a terrain signal indicative of the nature of terrain over which a vehicle is driving, the method comprising determining the predetermined amount of slip in further dependence on the terrain signal.

Optionally, receiving the terrain signal comprises receiving a signal indicative of an amount of drag on a vehicle.

Optionally, receiving a terrain signal comprises receiving a signal indicative of a driving mode in which a vehicle is operating.

Optionally, receiving a signal indicative of a driving mode in which a vehicle is operating comprises receiving a signal indicative of a state of a manual driving mode selector input device or a signal indicative of a driving mode selected automatically by automatic driving mode selection means.

The method may comprise causing at least one vehicle subsystem to operate in a selected one of a plurality of subsystem control modes of the at least one subsystem in dependence on the driving mode in which the vehicle is operating.

In a further aspect of the invention for which protection is sought there is provided a method of controlling a motor vehicle implemented by a controller comprising:

receiving a signal indicative of a surface friction parameter, surface_friction, corresponding to a coefficient of friction between a road wheel and a driving surface;

receiving a signal indicative of a position of an accelerator control with respect to an allowable range of positions, accel_ctrl_pos;

determining a powertrain torque limit value, PT_TQ_MAX, corresponding to an amount of powertrain torque at which slip of a driving wheel is expected to exceed a predetermined amount, the value of PT_TQ_MAX being determined at least in part in dependence on the value of surface_friction; and determining and outputting a value of a parameter corresponding to an instant amount of torque to be developed by a powertrain, PT_TQ, in dependence at least in part on the signals indicative of accelerator control position, accel_ctrl_pos, and powertrain torque limit value, PT_TQ_MAX.

The method may comprise determining the predetermined amount of slip in dependence at least in part on at least one selected from amongst the surface friction parameter surface_friction.

The method may comprise receiving a signal indicative of instant vehicle speed, ref_speed, and determining the predetermined amount of slip in further dependence on ref_speed.

The method may comprise receiving a signal indicative of the nature of terrain over which a vehicle is driving, the method comprising determining the predetermined amount of slip in further dependence on the signal indicative of the nature of terrain over which a vehicle is driving.

Optionally, receiving a signal indicative of the nature of terrain comprises receiving a signal indicative of an amount of drag on a vehicle.

The amount of drag on a vehicle may be useful in identifying whether a vehicle is travelling over a readily deformable surface such as sand, which may present a particular challenge to a driver attempting to traverse such terrain.

Optionally, receiving a signal indicative of the nature of terrain comprises receiving a signal indicative of a driving mode in which a vehicle is operating.

Optionally, receiving a signal indicative of a driving mode in which a vehicle is operating comprises receiving a signal indicative of a state of a manual driving mode selector input device or a signal indicative of a driving mode selected automatically by automatic driving mode selection means.

The method may comprise causing at least one vehicle subsystem to operate in a selected one of a plurality of subsystem control modes of the at least one subsystem in dependence on the driving mode.

Optionally, each of the driving modes corresponds to one or more different driving conditions for a vehicle.

In an aspect of the invention for which protection is sought there is provided a carrier medium carrying computer readable code for controlling a vehicle to carry out the method of a preceding aspect.

In one aspect of the invention for which protection is sought there is provided a computer program product executable on a processor so as to implement the method of a preceding aspect.

In an aspect of the invention for which protection is sought there is provided a computer readable medium loaded with the computer program product according to a preceding aspect.

In one aspect of the invention for which protection is sought there is provided a processor arranged to implement the method of a preceding aspect, or the computer program product of a preceding aspect.

The controller described herein can comprise a control unit or computational device having one or more electronic processors. The system may comprise a single control unit or electronic controller or alternatively different functions of the controller may be embodied in, or hosted in, different control units or controllers. As used herein the term "control unit" will be understood to include both a single control unit or controller and a plurality of control units or controllers collectively operating to provide the stated control functionality. A set of instructions could be provided which, when executed, cause said computational device to implement the control techniques described herein. The set of instructions could be embedded in said one or more electronic processors. Alternatively, the set of instructions could be provided as software to be executed on said computational device.

Within the scope of this application it is envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

One or more embodiments of the invention will now be described, by way of example only, with reference to the accompanying figures in which.

DETAILED DESCRIPTION

Figure 1:
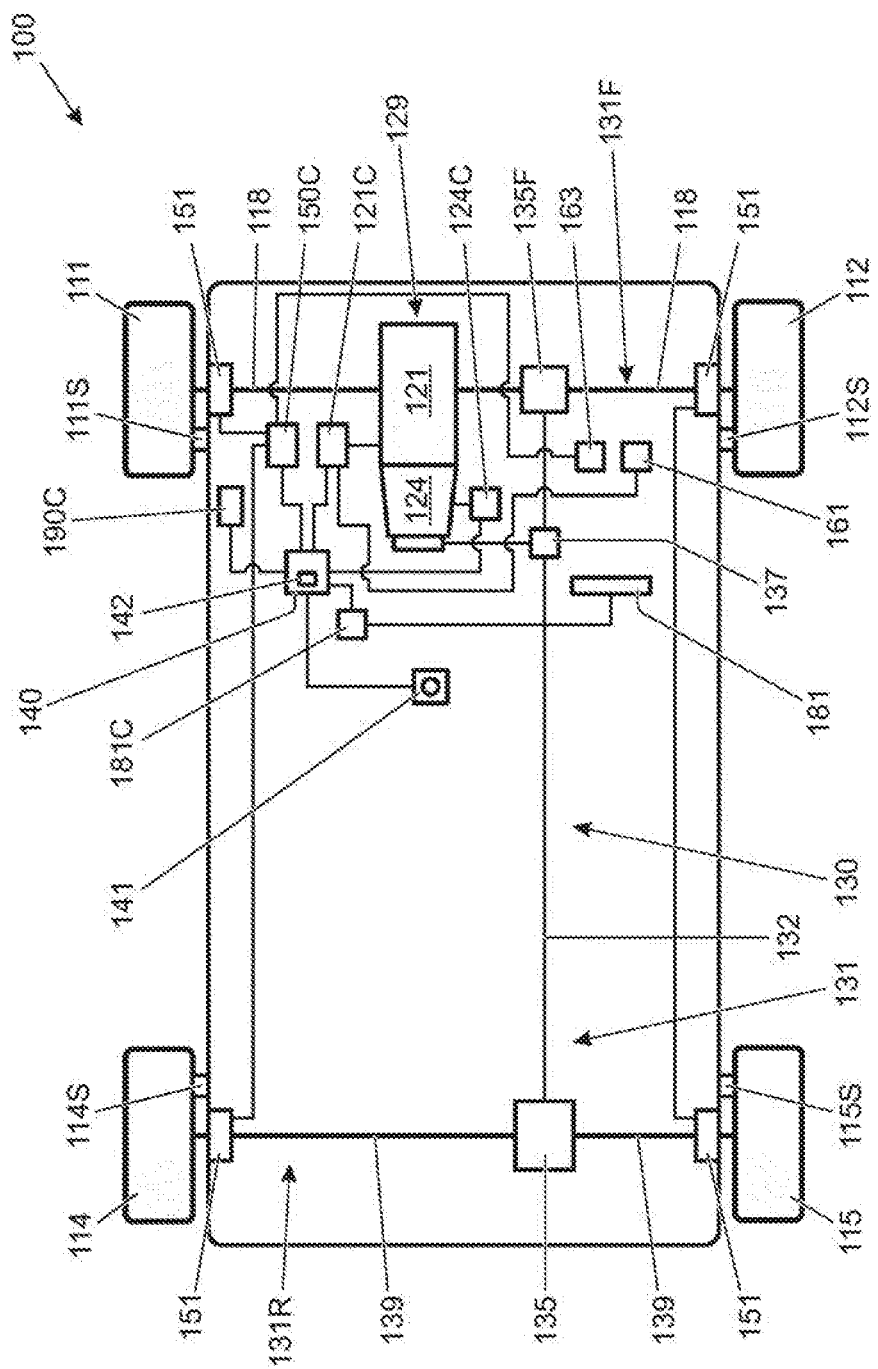
FIG. 1 is a schematic illustration of a motor vehicle according to an embodiment of the present invention.

FIG. 1 is a schematic illustration of a motor vehicle 100 according to an embodiment of the present invention. The vehicle 100 is intended to be suitable for off-road use, that is, for use on terrains other than regular tarmac road, as well as on-road. The vehicle 100 has a powertrain 129 that includes an engine 121 that is connected to a driveline 130 having a transmission 124. In the embodiment shown the transmission 124 is an automatic transmission 124. Embodiments of the present invention are also suitable for use in vehicles with a manual transmission, continuously variable transmission or any other suitable transmission.

The driveline 130 is arranged to drive a pair of front vehicle wheels 111,112 by means of a front differential 135F and a pair of front drive shafts 118. The front differential 135F and drive shafts 118 form part of a front axle portion 131F of the vehicle 100. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. The rear differential 135 and drive shafts 139 form part of a rear axle portion 131R of the vehicle 100.

In the embodiment of FIG. 1 the transmission 124 is releasably connectable to the auxiliary driveline portion 131 by means of a power transfer unit (PTU) 137, allowing selectable two wheel drive or four wheel drive operation. Other arrangements are also useful.

The PTU 137 is operable in a 'high ratio' or a 'low ratio' configuration, in which a gear ratio between an input shaft and an output shaft thereof is selected to be a high or low ratio. The high ratio configuration is suitable for general on-road or 'on-highway' operations whilst the low ratio configuration is more suitable for negotiating certain off-road terrain conditions and other low speed applications such as towing.

The vehicle 100 has an accelerator pedal 161, brake pedal 163 and a steering wheel 181.

The vehicle 100 has a central controller, referred to as a vehicle control unit (VCU) 140. The VCU 140 receives and outputs a plurality of signals to and from various sensors and subsystems provided on the vehicle 100.

The VCU 140 is in communication with a plurality of vehicle subsystem controllers including an engine controller 121C, a transmission controller 124C, an electronic power assisted steering controller (ePAS controller) 181C, an antilock braking system (ABS) controller 150C arranged to control brakes 151 associated with each wheel 111, 112, 114, 115 and a suspension system controller 190C. In some embodiments, instead of an ePAS controller 181C, a hydraulically operated power steering unit may be provided.

Although five subsystems are illustrated as being under the control of the VCU 140, in some embodiments a greater number of vehicle subsystems may be included on the vehicle and may be under the control of the VCU 140.

The VCU 140 includes a subsystem control module 142 which provides control signals to each of the vehicle subsystems to initiate control of the subsystems in a manner appropriate to the driving condition, such as the terrain, in which the vehicle is travelling (referred to as the terrain condition). The subsystems also communicate with the subsystems control module 142 to feed back information on subsystem status.

The VCU 140 is operable to control the subsystems to operate in one of a plurality of control modes. In each control mode, each subsystem is caused to assume one of a plurality of subsystem configuration modes. The control modes include a grass/gravel/snow control mode (GGS mode) that is suitable for when the vehicle is travelling in grass, gravel or snow terrain, a mud/ruts control mode (MR mode) which is suitable for when the vehicle is travelling in mud and ruts terrain, a rock crawl/boulder mode (RB mode) which is suitable for when the vehicle is travelling in rock or boulder terrain, a sand mode (sand mode) which is suitable for when the vehicle is travelling in sand terrain (or deep soft snow) and a special programs OFF mode (SP OFF mode) which is a suitable compromise mode, or general mode, for all terrain conditions and especially vehicle travel on motorways and regular roadways. Other control modes are also envisaged.

The different terrain types are grouped according to the friction of the terrain and the roughness of the terrain. For example, it is appropriate to group grass, gravel and snow together as terrains that provide a low friction, smooth surface and it is appropriate to group rock and boulder terrains together as high friction, very high roughness terrains.

A user may select a required control mode by means of control mode selector 141 shown in FIG. 1. The selector 141 is in the form of a dial that may be rotated to select the appropriate control mode. Systems implementing this functionality are known, and are described for example in US2003/0200016.

In addition to allowing manual section of a required control mode, the VCU 140 is also configured to determine automatically an appropriate control mode when the VCU 140 is placed in an automatic mode selection mode or condition, by means of the selector 141.

For purposes of this disclosure, it is to be understood that the controller(s) described herein can each comprise a control unit or computational device having one or more electronic processors. Vehicle 100 and/or a subsystem thereof may comprise a single control unit or electronic controller or alternatively different functions of the controller(s) may be embodied in, or hosted in, different control units or controllers. As used herein, the term "control unit" will be understood to include both a single control unit or controller and a plurality of control units or controllers collectively operating to provide the required control functionality. A set of instructions could be provided which, when executed, cause said controller(s) or control unit(s) to implement the control techniques described herein (including the method(s) described below). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present invention is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

Figure 2:
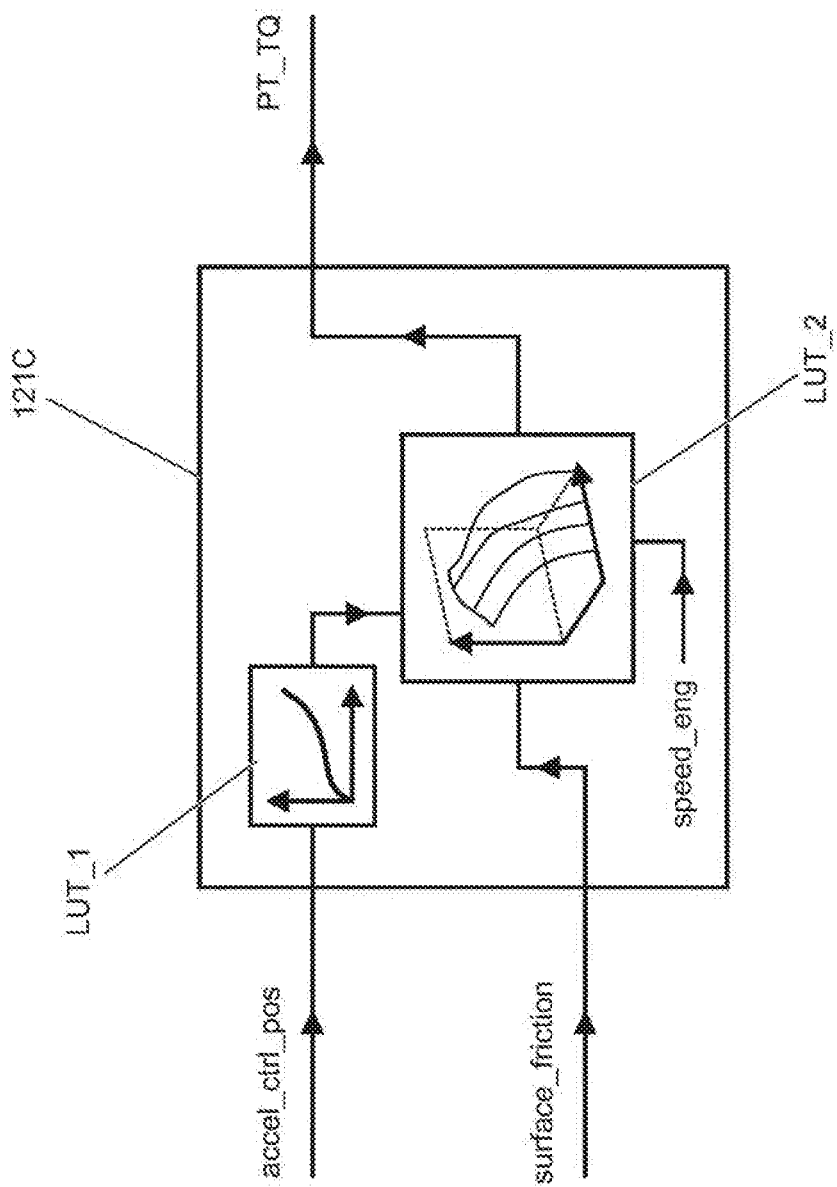
FIG. 2 is a schematic illustration of a motor vehicle controller according to an embodiment of the present invention.

FIG. 2 illustrates certain functionality of the engine controller 121C. The engine controller 121C is arranged to receive a signal accel_ctrl_pos from the accelerator pedal 161 indicative of an amount by which accelerator pedal 161 has been depressed. The signal indicates the position of the pedal 161 with respect to an allowable range of travel. In the present embodiment the signal has a value in the range from 0 to 1, where 0 corresponds to a released position of the pedal 161 and 1 corresponds to a fully depressed position of the pedal 161. The value of accel_ctrl_pos is used by the controller 121C to determine an amount of torque that the engine 121 is required to develop at a given moment in time, PT_TQ, as described in more detail below.

The engine controller 121C also receives a signal surface_friction indicative of a coefficient of friction between a surface over which a vehicle 100 is driving and a road wheel of the vehicle 100. The coefficient of friction may also be referred to as a 'surface mu' value. The value of signal surface_friction is used by the controller 121 to determine the value of PT_TQ at a given moment time as described below.

In the present embodiment, the value of surface_friction is calculated by ABS controller 150C based on a comparison between wheel speed signals received by the ABS controller 150C and a vehicle reference speed value v_ref corresponding to an actual speed of the vehicle 100 over ground. The wheel speed signals are generated by wheel speed sensors 111S, 112S, 114S, 115S associated with respective wheels of the vehicle 100. The ABS controller 150C is configured to estimate the value of surface_friction based at least in part on measurements of wheel slip for a given amount of torque applied to a wheel. In the present embodiment, the amount of slip of a given road wheel is defined as the difference between the speed of a given wheel 111, 112, 114, 115 and v_ref.

In response to receipt of the signal surface_friction, the engine controller 121C is configured to determine the amount of torque that may be applied to a driving wheel of the vehicle 100 before the amount of slip of the driving wheel will exceed a prescribed slip value. In the present embodiment the prescribed slip value is determined taking into account vehicle speed v_ref. That is, the prescribed slip value is dependent on vehicle speed, typically increasing with vehicle speed although other arrangements are also useful.

The controller 121C obtains the prescribed slip value by reference to a look-up table (LUT) that provides values of prescribed slip as a function of v_ref. In some embodiments, the controller 121C obtains the prescribed slip value also taking into account the driving mode in which the vehicle 100 is operating, driving_mode. In some driving modes larger amounts of slip are allowed for a given vehicle speed compared with other driving modes, and the controller is configured to take this into account in determining the prescribed slip value.

In some embodiments the controller 121C also takes into account an amount of weight that is acting on each driving wheel, or on each axle that is delivering drive torque to drive the vehicle 100, in calculating the amount of torque that is required to be applied to a given wheel or axle 131F, 131R in order to cause the prescribed amount of slip for that wheel or axle. This is because the amount of torque that may be applied to a wheel in order to cause a given amount of slip typically increases with increasing weight on a wheel for a given value of surface mu. The weight acting on each wheel or axle 131F, 131R may be determined by reference to information indicative of a distribution of weight between forward and rear axles 131F, 131R, for example by reference to an amount of travel of a suspension of a given wheel 111, 112, 114, 115 relative to a reference position of the suspension.

After determining an estimated value of the amount of torque that would be required to cause a given driving wheel 111, 112, 114, 115 to exhibit slip of the prescribed amount, the controller 140 calculates a specific amount of torque that the engine 121 is required to develop, PT_TQ_CRIT, in order to deliver the calculated amount of torque at a given driving wheel 111, 112, 114, 115 or axle 131F, 131R, under the instant configuration of the driveline 130. The specific amount of torque is calculated taking into account a gear ratio between an output shaft of the engine 121 and driving wheel. This specific engine torque value may be referred to as a critical engine torque value since it is the amount of torque required in order to cause the predetermined amount of wheel slip to be developed.

The controller 121 then calculates a position of accelerator pedal 161, accel_ctrl_pos, that corresponds to engine torque PT_TQ_CRIT. That is, the controller 121 calculates the value of accel_ctrl_pos that would be required in order to obtain an amount of engine torque, PT_TQ equal to PT_TQ_CRIT by inversion of a known relationship between accel_ctrl_pos and PT_TQ. The controller 121 then softens a response of the engine 121 to values of accel_ctrl_pos immediately below that required to cause the engine 121 to develop an amount of torque PT_TQ_CRIT.

It is to be understood that in the present embodiment the relationship between accel_ctrl_pos and engine torque PT_TQ is dependent on the driving mode in which the vehicle is operating, driving_mode. In some embodiments PT_TQ may further depend on the driveline ratio between engine output shaft and one or more driving wheels. Thus the controller 121 may in some embodiments calculate the value of PT_TQ taking into account accel_ctrl_pos and driveline ratio. It is to be understood that for a given amount of torque PT_TQ developed by the engine 121, the amount of torque applied to a given wheel by the driveline 130 will of course depend on the driveline ratio regardless of how the value of PT_TQ is determined.

As noted above, in the present embodiment the available driving modes are GGS mode, RC mode, MR mode, sand mode and a highway mode also referred to as SPO ('special programs off') mode. It is to be understood that the term 'special programs' refers to the fact that adjustments are made in the operation of the vehicle, such as the relationship between PT_TQ and accel_ctrl_pos when operating in a mode other than SPO, relative to the SPO mode, which may also be referred to as a 'baseline' or 'default' mode of operation of the vehicle 100.

It is to be further understood that, in calculating the amount of engine torque to be developed for a given accelerator pedal position, PT_TQ, the engine controller 121 first converts the accelerator pedal position signal accel_ctrl_pos into a mapped accelerator pedal position signal, accel_ctrl_pos_mapped, the form of the mapping between accel_ctrl_pos and accel_ctrl_pos_mapped being dependent on driving_mode. The mapped accelerator pedal position signal is then used to determine the amount of engine torque to be developed at a given moment in time. The conversion of accel_ctrl_pos into a mapped accelerator pedal position signal, accel_ctrl_pos_mapped, is performed by reference to a first look-up-table LUT_1 (FIG. 2) that stores values of accel_ctrl_pos_mapped as a function of values of accel_ctrl_pos for each value of driving_mode. As noted above, it is to be understood that the amount of torque applied to a given wheel for a given value of torque generated by the engine 121 will depend on the driveline ratio, for example the effective gear ratio between an output shaft of the engine 121 and a given wheel of the vehicle 100.

In some alternative embodiments the first look-up table LUT_1 may store values of accel_ctrl_pos_mapped as a function of values of accel_ctrl_pos for each value of driving_mode for each of a plurality of driveline ratios that may be provided by the driveline 130.

Figure 4:
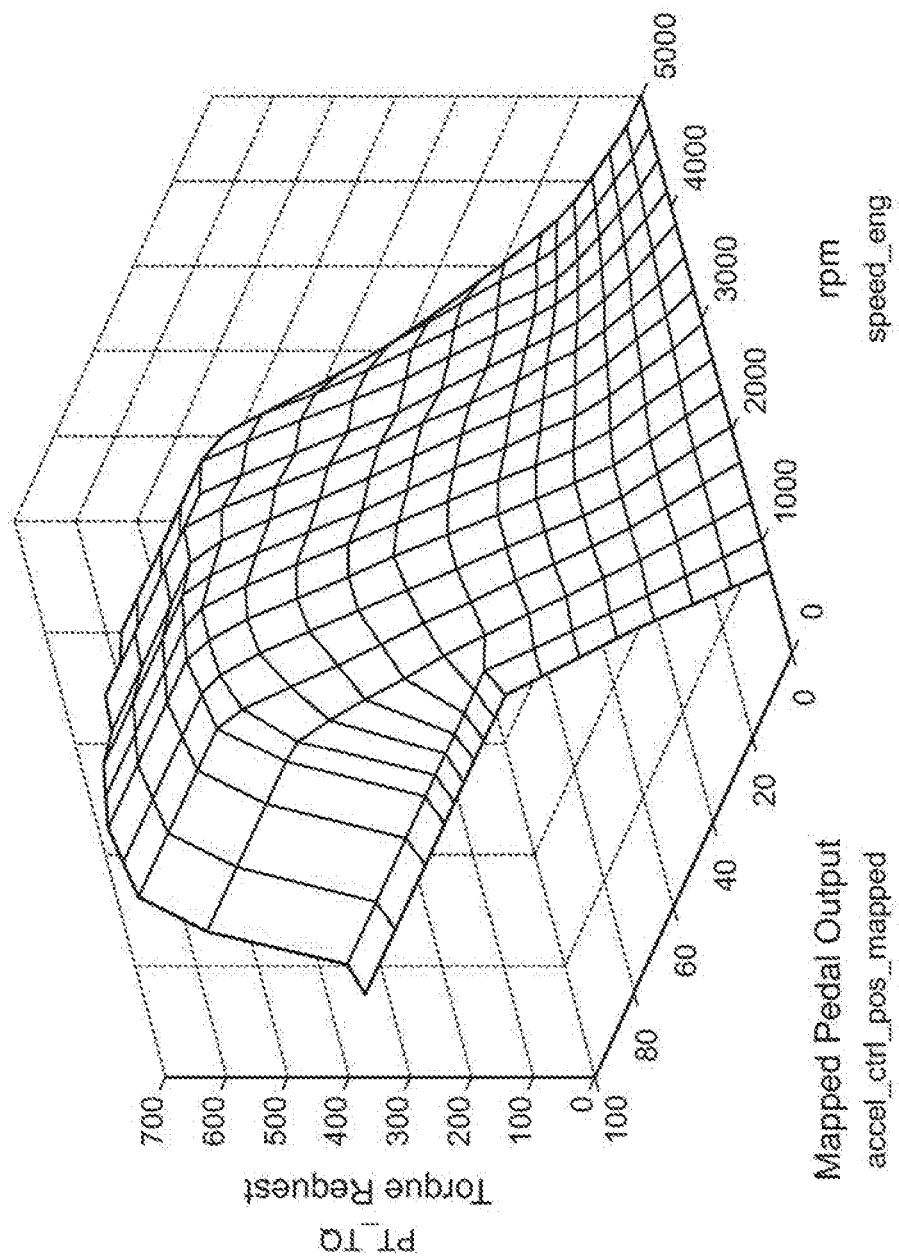
FIG. 4 is a plot of an amount of torque an engine is commanded to develop, PT_TQ as a function of mapped accelerator pedal position signal accel_ctrl_pos_mapped and engine speed speed_eng.
Figure 5:
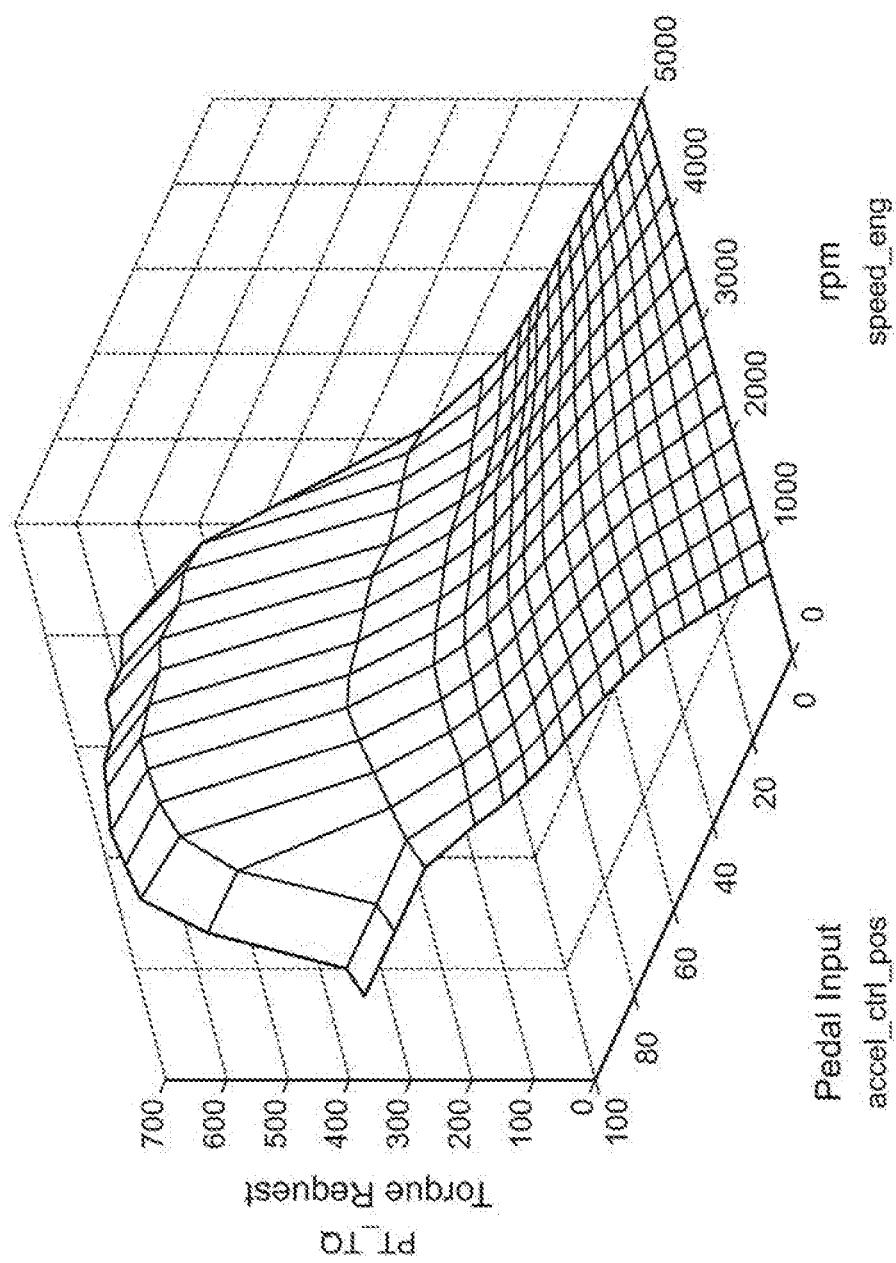
FIG. 5 is a plot of an amount of torque an engine is commanded to develop, PT_TQ as a function of accelerator pedal position signal accel_ctrl_pos and engine speed speed_eng.

Having calculated a value of accel_ctrl_pos_mapped, the controller 121 passes the value of accel_ctrl_pos_mapped to a second look-up-table LUT_2 that relates the speed of rotation of the output shaft of the engine 121, speed_eng, to accel_ctrl_pos_mapped and the amount of torque that the engine 121 is to be caused to develop at the output shaft, PT_TQ. Thus the controller 121 calculates a value of PT_TQ that is to be developed for the prevailing values of accel_ctrl_pos_mapped and speed_eng, and causes the engine to develop an amount of torque corresponding to the value of PT_TQ. FIG. 4 is an example of a plot of PT_TQ as a function of accel_ctrl_pos_mapped and speed_eng, on which the data stored in LUT_2 is based. It is to be understood that, in some embodiments, instead of having two inputs accel_ctrl_pos_mapped and speed_eng, LUT_2 may have only one input, accel_ctrl_pos_mapped. In this case, LUT_2 may be configured to output a value of torque that is substantially equal to the mean torque across the range of values of speed_eng instead of a value that is further dependent on speed_eng, i.e. the value of PT_TQ may be substantially independent of speed_eng. Other arrangements may be useful in some embodiments.

As noted above, in the present embodiment, the controller 121 configures the first look-up-table LUT_1 in such a manner as to soften or 'flatten' the response of the engine 121 to movement of the accelerator pedal 161 for accelerator pedal positions immediately below that required to cause the engine 121 to develop torque PT_TQ_CRIT. The controller 121 achieves this by reference to a baseline or reference relationship between accel_ctrl_pos and accel_ctrl_pos_mapped stored by the controller 121 for each driving mode and driveline ratio. The baseline relationship is modified to soften the response of the engine 121 to movement of the accelerator pedal 161 for accelerator pedal positions in the vicinity of that required to develop torque PT_TQ_CRIT. This is so as to provide a driver with greater control of engine torque in the vicinity of this pedal position, and discourage a driver from demanding torque exceeding PT_TQ_CRIT.

Figure 3:
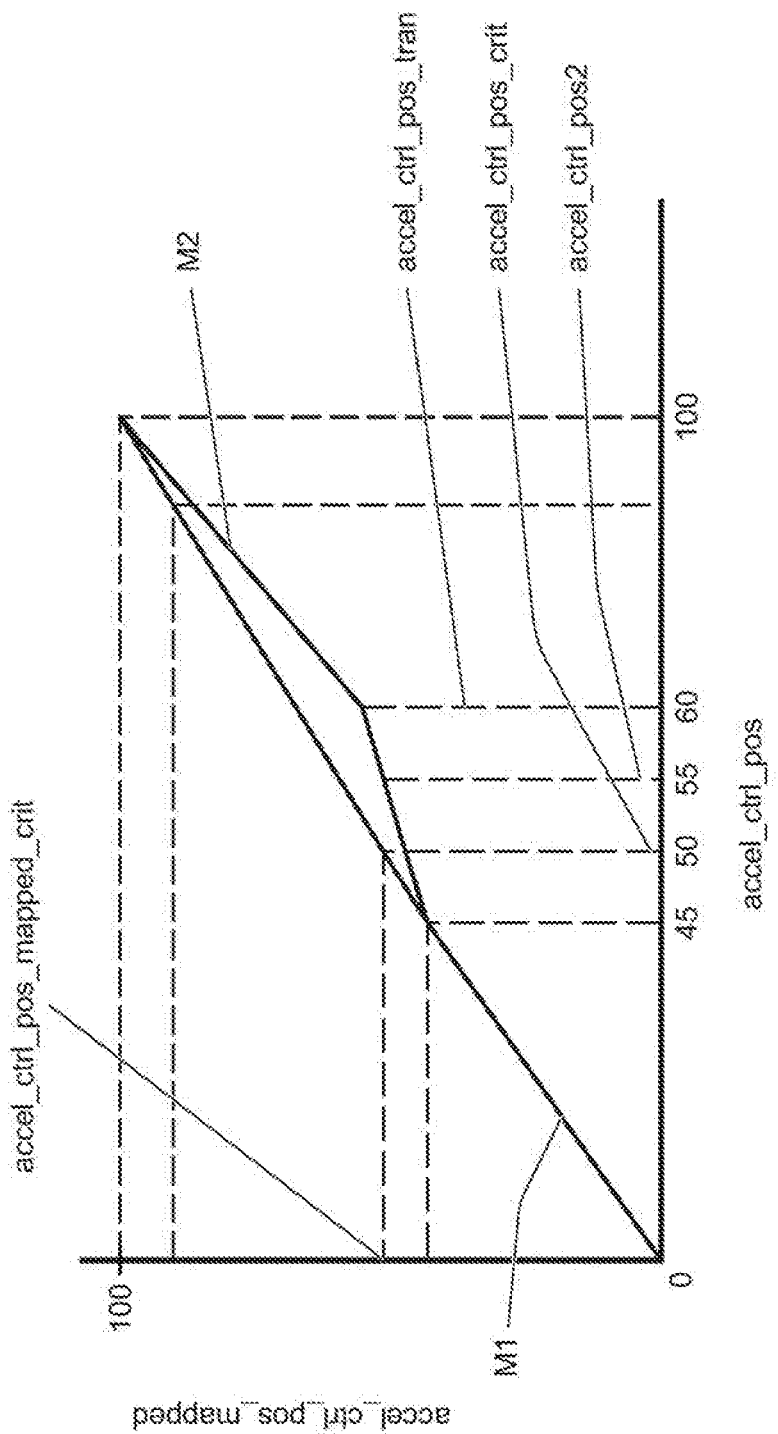
FIG. 3 is a plot of a mapped accelerator pedal position signal accel_ctrl_pos_mapped as a function of accelerator pedal position accel_ctrl_pos in a controller according to an embodiment of the present invention.

A baseline relationship between accel_ctrl_pos_mapped and accel_ctrl_pos for the SPO driving mode and one particular driveline ratio for the present embodiment of the invention is plotted as trace M1 in FIG. 3. After calculating a value of PT_TQ_CRIT, the controller 121 determines the value of accel_ctrl_pos, i.e. the value accel_ctrl_pos_crit, required to cause the engine 121 to develop torque PT_TQ_CRIT according to the baseline relationship M1. The controller 121 then generates a modified relationship between accel_ctrl_pos_mapped and accel_ctrl_pos by setting a gradient of the plot of accel_ctrl_pos_mapped as a function of accel_ctrl_pos to a prescribed value starting at a value of accel_ctrl_pos that is a prescribed proportion of accel_ctrl_pos_crit. In the present embodiment the prescribed gradient is set to half of that of the baseline relationship at the point where accel_ctrl_pos=accel_ctrl_pos_crit, and the prescribed proportion is set to 90%. Other gradients are also useful. Other prescribed proportions are also useful. In some embodiments the prescribed gradient is a substantially fixed value, such as 0.5, 0.3 or any other suitable value. The gradient of the baseline relationship is set to the prescribed value for values of accel_ctrl_pos up to values that are 10% higher than the new value of accel_ctrl_pos at which the amount of torque demanded of the engine 121 is substantially equal to PT_TQ_CRIT.

In some embodiments, the gradient of the plot of accel_ctrl_pos_mapped as a function of accel_ctrl_pos is determined in dependence on the amount of confidence that may be placed in the value of surface_friction. In some embodiments, the gradient is set in dependence on the instant variance in the value of surface_friction. In some embodiments the gradient may be reduced for lower values of variance relative to higher values, i.e. lower values of gradient are employed where greater confidence may be placed in the value of surface_friction.

With reference to the baseline relationship plotted in FIG. 3, the modified relationship between accel_ctrl_pos_mapped and accel_ctrl_pos is represented by trace M2. It can be seen from FIG. 3 that the value of accel_ctrl_pos_crit is substantially equal to 50% accelerator pedal depression in the particular example shown. Accordingly, the controller 121 configures LUT_1 to set the gradient of the plot of accel_ctrl_pos_mapped as a function of accel_ctrl_pos to a value of substantially 0.5 for values of accel_ctrl_pos above 45% accelerator pedal depression. The controller 121 then calculates the new value of accel_ctrl_pos corresponding to a demanded engine torque of PT_TQ_CRIT, accel_ctrl_pos2. In the example of FIG. 3 the value of accel_ctrl_pos2 is substantially 55%. The controller 121 then determines that the gradient of the plot of accel_ctrl_pos_mapped as a function of accel_ctrl_pos should remain substantially equal to 0.5 up to values of accel_ctrl_pos ten percent above 55%, i.e. 60% to the nearest 5% of full pedal stroke. For values of accel_ctrl_pos above 60%, the controller 121 causes accel_ctrl_pos_mapped to transition substantially linearly to maximum engine torque when accel_ctrl_pos is substantially 100%. In some alternative embodiments the relationship between acc_ctrl_pos_mapped and accel_ctrl_pos above the range of values of accel_ctrl_pos over which the gradient is flattened may be calculated according to a different methodology.

It is to be understood that the controller 121 employs the new relationship between accel_ctrl_pos_mapped and accel_ctrl_pos represented by plot M2 to determine the value of accel_ctrl_pos_mapped for a given value of signal accel_ctrl_pos, instead of plot M1, until a change in surface_mu of more than a prescribed amount is detected, or a change in driving mode occurs. In the present embodiment, the prescribed amount of the change in surface mu is 0.1 although other values are also useful. In embodiments in which the relationship between accel_ctrl_pos and accel_ctrl_pos_mapped is dependent on driveline ratio, the controller 121 may also recalculate the relationship between accel_ctrl_pos and accel_ctrl_pos_mapped whenever a change in driveline ratio occurs. Other arrangements are also useful.

It is to be understood that the controller 121 implements this strategy by recalculating look-up-table LUT_1 each time the value of surface_friction changes by more than a prescribed amount. In some embodiments LUT_1 is recalculated each time the value of surface_friction changes by 0.1 or more. In some embodiments, when it is required to access the default (i.e. not flattened) relationship between accel_pedal_pos and accel_pedal_pos_mapped when the relationship according to LUT_1 has been modified, the controller 121 may load the default values into LUT_1 from an area of a memory of the controller 121, typically a location of permanent (non volatile) memory.

In one embodiment, LUT_1 is arranged to store data relating accel_ctrl_pos and accel_ctrl_pos_mapped that has been calculated according to a polynomial mathematical relationship. In one embodiment, the following mathematical relationship is employed between accel_ctrl_pos (x) and accel_ctrl_pos_mapped (y):

$$y = a \cdot x^4 + b \cdot x^3 + c \cdot x^2 + d \cdot x + e \quad (1)$$

Alternative mathematical relationships may be used in some embodiments. For example, higher or lower order polynomial equations may be employed in some embodiments. In some embodiments, instead of storing look-up table data, values of accel_ctrl_pos_mapped for a given value of accel_ctrl_pos are determined directly by the controller 121 by means of a mathematical equation such as equation (1).

In some embodiments, the coefficients of equation (1) or other relationship may be obtained taking into account the following functional requirements:
  (a) When x=0, y=0
  (b) dy/dx when x=0, y=0 is equal to 'd', d being a value determined empirically to give a desirable response to accelerator pedal actuation
  (c) when x=100%, y=100%
  (d) when y=accel_ctrl_pos_mapped_crit, x=accel_ctrl_pos_crit (determined by inversion of LUT_1 currently in use)
  (e) dy/dx (when x=accel_ctrl_pos_crit) is set to a value determined empirically to give a desirable response to accelerator pedal actuation when x=accel_ctrl_pos_crit.

In some embodiments, the value of dy/dx when x=accel_ctrl_pos_crit is determined in dependence on the amount of confidence that may be placed in the value of surface_friction. In some embodiments, the value of dy/dx when x=accel_ctrl_pos_crit is set in dependence on the instant variance in the value of surface_friction. In some embodiments the value of dy/dx when x=accel_ctrl_pos_crit may be reduced for lower values of variance relative to higher values.

Embodiments of the present invention have the advantage that the amount of torque that an engine controller 121 causes an engine 121 to develop in dependence on accelerator pedal position is caused to change relatively slowly with accelerator pedal position as accelerator pedal position approaches the position at which engine torque becomes equal to the estimated amount of torque required to cause wheel slip exceeding a prescribed value. Accordingly, the driver is able to enjoy enhanced control of engine output torque (and therefore wheel torque) over a range of stroke of the accelerator pedal immediately preceding the position of the accelerator pedal at which slip exceeding the prescribed value is expected to occur. Embodiments of the present invention enable a vehicle 100 to be driven with enhanced composure since a driver may readily sense when excessive wheel slip is about to occur by detecting a reduced (i.e. a flattened) rate of response, optionally substantially a plateau in response by the engine 121 to depression of the accelerator pedal 161, prior to the pedal position corresponding to PT_TQ_CRIT. The driver may therefore take action to prevent the pedal reaching the position corresponding to PT_TQ_CRIT, thereby preventing or at least reducing a value of excess wheel slip experienced by the vehicle.

It is to be understood that when a change in the value of surface_friction is detected, the controller 121 is configured to manage the transition from one relationship between accel_ctrl_pos and accel_ctrl_pos_mapped to a new relationship between accel_ctrl_pos and accel_ctrl_pos_mapped such that the relationship transitions in a gradual manner. The controller 121 may be configured to achieve this by blending the relationships such that the new relationship gradually becomes the dominant factor in determining accel_ctrl_pos_mapped as a function of time. Other arrangements are also useful in some embodiments.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A motor vehicle controller comprising a data processing apparatus, the data processing apparatus comprising:
    a first electrical connection terminal receiving a surface friction signal indicative of a coefficient of friction between a road wheel and a driving surface from a wheel sensor or a first controller; and
    a second electrical connection terminal receiving from an accelerator an input accelerator position signal indicative of a position of the accelerator with respect to an allowable range of positions;
    the data processing apparatus being configured to determine a powertrain torque limit value corresponding to an amount of powertrain torque at which the data processing apparatus determines that slip of a driving wheel will exceed a predetermined amount of slip, the powertrain torque limit value being determined at least in part in dependence on the surface friction signal;
    the data processing apparatus being configured to determine and output a powertrain torque demand signal corresponding to an instant amount of torque to be developed by a powertrain, the powertrain torque demand signal being determined in dependence at least in part on the input accelerator position signal according to a predetermined relationship between the powertrain torque demand signal and the input accelerator position signal,
    the data processing apparatus being further configured to determine a target accelerator position signal corresponding to the powertrain torque limit value, according to the predetermined relationship between the powertrain torque demand signal and the input accelerator position signal, the controller being configured such that when the input accelerator position signal approaches the target accelerator position signal and the input accelerator position signal has a value that is within a predetermined range of the target accelerator position signal corresponding to the powertrain torque limit value, such that the powertrain torque demand signal is within a predetermined range of the powertrain torque limit value, the relationship between powertrain torque demand signal and input accelerator position signal is modified relative to the predetermined relationship between the powertrain torque demand signal and the input accelerator position signal such that a response of the powertrain torque demand signal to the input accelerator position signal is reduced.

2. A controller according to claim 1 wherein the predetermined range corresponds with a predetermined proportion of the target accelerator position signal.

3. A controller according to claim 1 wherein the predetermined range corresponds with a predetermined proportion of one selected from amongst the powertrain torque limit value and the powertrain torque demand signal.

4. A controller according to claim 1 configured wherein the predetermined amount of slip is determined by the data processing apparatus in dependence at least in part on the surface friction signal.

5. A controller according to claim 4 configured to receive a reference speed signal indicative of an instant vehicle speed, the controller being configured to determine the predetermined amount of slip in further dependence on the reference speed signal.

6. A controller according to claim 1 configured to receive a terrain signal indicative of a nature of terrain over which a vehicle is driving, the controller being configured to determine the predetermined amount of slip in further dependence on the terrain signal and wherein the terrain signal comprises one or more of a signal indicative of an amount of drag on a vehicle and a driving mode signal indicative of a driving mode in which a vehicle is operating.

7. A motor vehicle control system comprising a controller according to claim 6 wherein the driving mode in which the vehicle is operating is one of a plurality of driving modes, the plurality of driving modes being a plurality of subsystem control modes of at least one subsystem of a plurality of subsystems of the vehicle, the control system having a subsystem controller for initiating control of a vehicle subsystem in a selected one of the plurality of subsystem control modes, each one of the driving modes corresponding to one or more different driving conditions for the vehicle and wherein in each subsystem control mode the system is configured to cause the at least one subsystem of the plurality of vehicle subsystems to be operated in a subsystem configuration mode in dependence on the one or more different driving conditions, said plurality of driving modes including one or more of the following:
    a plurality of subsystem control modes of at least one vehicle subsystem selected from amongst an engine management system, a transmission system, a steering system, a brakes system and a suspension system;
    a plurality of subsystem control modes of a suspension system, wherein the subsystem configuration mode is one of a plurality of subsystem configuration modes and the plurality of subsystem configuration modes provide a plurality of ride heights;
    a plurality of subsystem control modes of a fluid suspension system in which fluid interconnection can be made between suspensions for wheels on opposite sides of the vehicle, wherein the subsystem configuration mode is one of a plurality of subsystem configuration modes and wherein said plurality of subsystem configuration modes provide different levels of said interconnection;
    a plurality of subsystem control modes of a steering system which can provide steering assistance, wherein the subsystem configuration mode is one of a plurality of subsystem configuration modes and wherein said plurality of subsystem configuration modes provide different levels of said steering assistance;
    a plurality of subsystem control modes of a brakes system which can provide braking assistance, wherein the subsystem configuration mode is one of a plurality of subsystem configuration modes and wherein said plurality of subsystem configuration modes provide different levels of said braking assistance;
    a plurality of subsystem control modes of a brake control system which can provide an anti-lock function to control wheel slip, wherein the subsystem configuration mode is one of a plurality of subsystem configuration modes and wherein said plurality of subsystem configuration modes allow different levels of said wheel slip;

a plurality of subsystem control modes of a powertrain system which includes a powertrain controller and an accelerator or throttle pedal, wherein the subsystem configuration mode is one of a plurality of subsystem configuration modes and wherein the plurality of subsystem configuration modes provide different levels of responsiveness of the powertrain controller to movement of the accelerator or throttle pedal;

a plurality of subsystem control modes of a traction control system which is arranged to control wheel spin, wherein the subsystem configuration mode is one of a plurality of subsystem configuration modes and wherein said plurality of subsystem configuration modes allow different levels of said wheel spin a plurality of subsystem control modes of a yaw control system which is arranged to control vehicle yaw, wherein the subsystem configuration mode is one of a plurality of subsystem configuration modes and wherein said plurality of subsystem configuration modes allow different levels of divergence of said vehicle yaw from an expected yaw;

a plurality of subsystem control modes of a range change transmission, wherein the subsystem configuration mode is one of a plurality of subsystem configuration modes and wherein said plurality of subsystem configuration modes may include a high range mode and a low range mode of said transmission; and a plurality of subsystem control modes of a transmission system operable in a plurality of transmission ratios and including a transmission controller arranged to monitor at least one parameter of the vehicle and to select the transmission ratios in response to the at least one parameter, wherein the subsystem configuration mode is one of a plurality of subsystem configuration modes and wherein said plurality of subsystem configuration modes include a plurality of transmission configuration modes in which the transmission ratios are selected in response to said at least one parameter.

8. A motor vehicle comprising a controller according to claim 1.

9. A method of controlling a motor vehicle implemented by a controller, the method comprising:
receiving a surface friction signal indicative of a coefficient of friction between a road wheel and a driving surface;
receiving an input accelerator position signal indicative of a position of an accelerator with respect to an allowable range of positions;
determining a powertrain torque limit value corresponding to an amount of powertrain torque at which slip of a driving wheel is expected to exceed a predetermined amount of slip, the powertrain torque limit value being determined at least in part in dependence on the surface friction signal;
determining and outputting a powertrain torque demand signal corresponding to an instant amount of torque to be developed by a powertrain, the powertrain torque demand signal being determined in dependence at least in part on the input accelerator position signal according to a predetermined relationship between the powertrain torque demand signal and the input accelerator position signal, and
determining a target accelerator position signal corresponding to the powertrain torque limit value, according to the predetermined relationship between the powertrain torque demand signal and the input accelerator position signal;
whereby when the input accelerator position signal approaches the target accelerator position signal and the input accelerator position signal has a value that is within a predetermined range of the target accelerator position signal corresponding to the powertrain torque limit value such that the powertrain torque demand signal is within a predetermined range of the powertrain torque limit value, the relationship between the powertrain torque demand signal and the input accelerator position signal is modified relative to the predetermined relationship between the powertrain torque demand signal and the input accelerator position signal wherein the powertrain torque demand signal is output such that a response of the powertrain torque demand signal to the input accelerator position signal is reduced.

10. A method according to claim 9 whereby the predetermined range corresponds with a predetermined proportion of the target accelerator position signal.

11. A method according to claim 9 whereby the predetermined range corresponds with a predetermined proportion of one selected from amongst the powertrain torque limit value and the powertrain torque demand signal.

12. A method according to claim 9 comprising determining the predetermined amount of slip in dependence at least in part on the surface friction signal.

13. A non-transitory carrier medium carrying computer readable code for controlling a vehicle to carry out the method of claim 9.

14. A non-transitory computer readable medium having stored thereon computer code that, when executed on a processor of the vehicle causes the vehicle to implement the method of claim 9.

15. A processor arranged to implement the method of claim 9.

* * * * *